Jan. 7, 1958 W. A. GEYGER 2,819,439
SINGLE STAGE, SELF-BALANCING MAGNETIC SERVO AMPLIFIER
Filed Oct. 2, 1956 8 Sheets-Sheet 1

INVENTOR.
W. A. GEYGER
BY
G. H. O'Brien
W. O. Quesenbery
ATTYS

INVENTOR.
W. A. GEYGER
BY
[signatures] ATTYS

INVENTOR.
W. A. GEYGER
BY
ATTYS

Jan. 7, 1958 W. A. GEYGER 2,819,439
SINGLE STAGE, SELF-BALANCING MAGNETIC SERVO AMPLIFIER
Filed Oct. 2, 1956 8 Sheets-Sheet 4
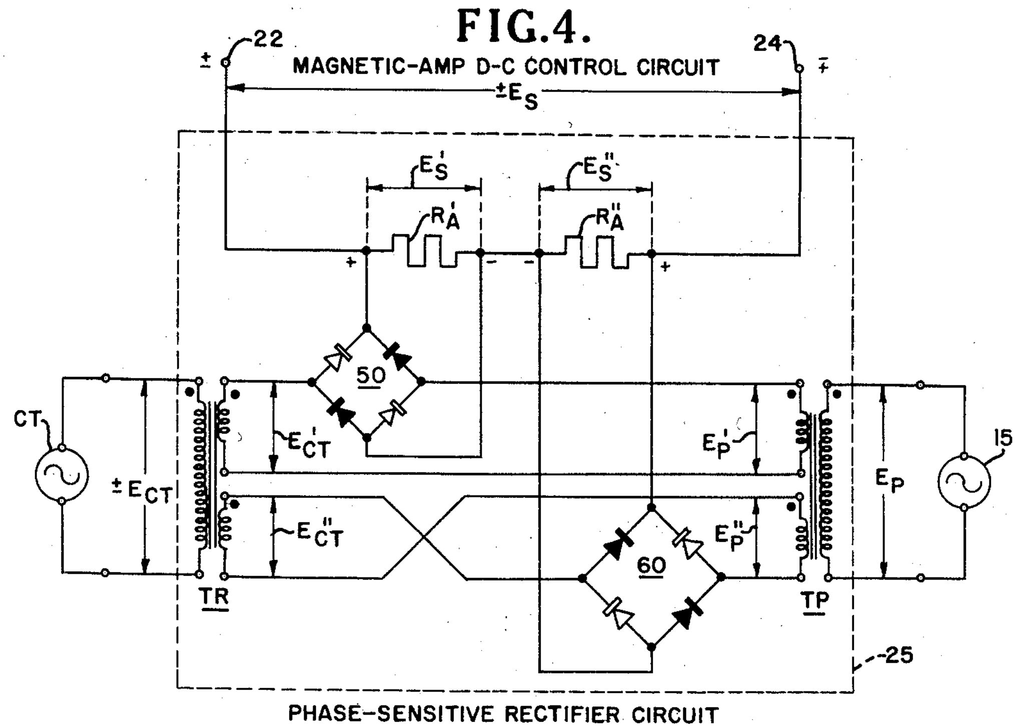
PHASE-SENSITIVE RECTIFIER CIRCUIT
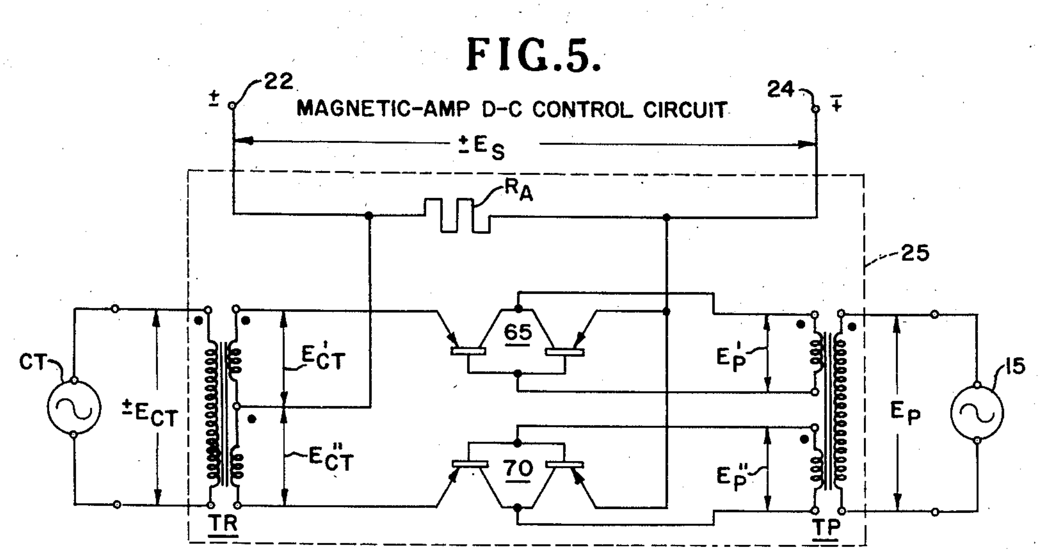
TRANSISTOR DEMODULATOR CIRCUIT
INVENTOR.
W. A. GEYGER
BY
G. R. O'Brien
W. O. Quesenberry
ATTYS

INVENTOR.
W. A. GEYGER
BY
ATTYS

Jan. 7, 1958 W. A. GEYGER 2,819,439

SINGLE STAGE, SELF-BALANCING MAGNETIC SERVO AMPLIFIER

Filed Oct. 2, 1956 8 Sheets-Sheet 6

INVENTOR.
W. A. GEYGER
BY
[signatures]
ATTYS

Jan. 7, 1958 W. A. GEYGER 2,819,439

SINGLE STAGE, SELF-BALANCING MAGNETIC SERVO AMPLIFIER

Filed Oct. 2, 1956 8 Sheets-Sheet 7

INVENTOR.

W. A. GEYGER

BY

ATTYS

Jan. 7, 1958 W. A. GEYGER 2,819,439

SINGLE STAGE, SELF-BALANCING MAGNETIC SERVO AMPLIFIER

Filed Oct. 2, 1956

8 Sheets-Sheet 8

INVENTOR.
W. A. GEYGER

BY

ATTYS 2,819,439

SINGLE STAGE, SELF-BALANCING MAGNETIC SERVO AMPLIFIER

William A. Geyger, Takoma Park, Md., assignor to the United States of America as represented by the Secretary of the Navy Application October 2, 1956, Serial No. 613,588

11 Claims. (Cl. 318—30)

(Granted under Title 35, U. S. Code (1952), sec. 266)

The invention described herein may be manufactured and used by or for the Government of the United States of America for governmental purposes without the payment of any royalties thereon or therefor.

This invention relates to magnetic servo amplifier arrangements in high performance servo mechanisms having a two-phase A. C. motor load, and more particularly pertains to self-balancing magnetic amplifier arrangements controlled by a polarity-reversible D. C. signal from a phase-sensitive rectifier circuit which is energized with an A. C. error signal from a synchro-control transformer of a standard 60 or 400 cycle position servomechanism. Specifically, the present invention is directed to the combination of a single-stage, D. C.-controlled, push-pull self-balancing magnetic servo amplifier with a phase-sensitive rectifier circuit as the input control signal source therefor, the combination being characterized by the novel feature of utilizing auxiliary resistor elements to interconnect the output of the phase-sensitive rectifier to the input control circuit of the amplifier stage in such a manner that the control-winding current in the amplifier stage is substantially zero within the total range of operation of the amplifier. For certain applications in accordance with the teachings herein disclosed, error-rate damping or compensation of the servo system is achieved by introducing differentiating and/or integrating networks into the feedback channels of the amplifier itself.

In the field of servomechanisms, various and numerous types of full-wave or half-wave, single-stage or multi-stage, magnetic-amplifier push-pull circuit arrangements have been heretofore proposed and employed for operating the two-phase A. C. motor of position-indicating synchro-transmission systems. Although these prior art magnetic servo amplifiers have served the purpose for remote positioning applications, they are characterized by several serious disadvantages which deleteriously affect the resultant operation thereof.

For example, in order to obtain a sufficiently high speed of response of the magnetic amplifier, it has been found expedient to connect a high resistor in series with the control windings of the amplifier. Another reason for desiring a high value resistor in the control circuit is that, since the error signal source requires to look into an impedance of the order of ten to 100 times the internal impedance thereof to prevent loading down of the error-signal source, it is desirable to construct the input control circuit of the magnetic amplifier in such a manner as to present a high impedance to the error-signal source. However, restrictions are imposed on the magnitude of the input control circuit impedance that can be employed, since magnetic amplifiers inherently are low-input-impedance current-operated devices and hence require a low impedance in the input control circuit in order to obtain an output displaying any significant gain. Consequently, it has been the conventional practice to compromise between speed of response and gain by employing in the control circuit of the amplifier a series resistor of about 10,000 ohms which results in a speed of response of about 2 to 4 cycles of the power supply frequency and which presents to the error signal source an impedance of about 10 times the internal impedance of the error signal source. The effect of this practice upon the operational characteristics of a magnetic amplifier is that a very large voltage drop occurs across the control winding circuit with a resultant dissipation in this series resistor of a major portion (about 95%) of the total energy from the error signal source. Therefore, actually only a comparatively small part of the error-signal source energy is used for controlling the saturable reactor elements of the amplifier. The present invention overcomes these disadvantages by providing an arrangement in which the voltage drop across the control-winding circuit is substantially zero throughout the operating range of the magnetic amplifier and in which the control circuit presents, to the error signal source, an effective input impedance which is about 100 to 1000 times higher than the actual impedance of the control circuit.

Moreover, it is a well known and annoying characteristic of conventional forms of magnetic servo amplifiers that, with zero input, their output is not exactly zero as a result of actual deviations from perfect symmetry of the saturable reactor and rectifier components. This output, the asymmetry zero-drift error of the amplifier, may be minimized by using proper testing procedures for grading and matching of the magnetic cores and the rectifier elements. However, limitations of such errors to certain specified values still represents a difficult problem in design and production of high-performance magnetic servo amplifiers. The arrangements herein disclosed overcome this disadvantage by greatly reducing the requirements concerning grading and matching of the magnetic cores and the rectifier elements.

With the foregoing in mind, the general purpose of this invention is to provide, in a position-indicating synchro-transmission system, a magnetic-amplifier arrangement having a high speed of response of one half-cycle of the power-supply frequency, an input control circuit in which the actual impedance thereof is low but which presents a high impedance to the error signal source, and wherein the effective control current flowing in the control circuit is substantially zero so that negligible control current energy is dissipated therein to thereby result in a sufficiently high gain output as to require only a single-stage magnetic amplifier for position-servomechanism applications, the zero control current condition being additionally effective to minimize asymmetry zero-drift errors introduced by deviations from perfect symmetry of the saturable-reactor and rectifier components. For attaining these objectives, the invention is based upon the use of a magnetic amplifier of the self-balancing potentiometer type, which is described in my U. S. Patent No. 2,700,130 and which employs a novel combination of external or internal positive magnetic feedback and negative electric feedback in a D. C.-controlled, single-stage magnetic amplifier of the push-pull type for position servomechanism applications.

In accordance with the fundamental teachings of the aforesaid patent, a D. C.-controlled, single-stage, self-balancing magnetic amplifier consists in balancing the D. C. signal voltage by means of several voltage components which are supplied in time sequence by the actual voltage drop across feedback resistors carrying the full-wave direct output current of the amplifier, and by additional voltages induced in the control-winding elements from non-fired core components during their gating half-cycles. In order to operate a two-phase servo motor from such an arrangement, it is necessary to employ a magnetic amplifier of the push-pull type which supplies the two-phase motor and also the feedback circuit which applies negative feedback to the control-circuit loop. In order to convert a conventional push-pull magnetic-amplifier circuit utilizing either external feedback or self-saturation into a self-balancing arrangement, two feedback resistors and a center-tap control winding of the two-phase motor are connected with the two saturable-reactor systems in such a way that the resultant D. C. and A. C. components of the four variable half-cycles pulses are polarity reversible and are zero at zero input. In this manner, positive external feedback or self-saturation produces an effectively infinite gain that is highly degenerated by 100% negative feedback resistance-coupled into the control-circuit loop, and the separately excited two-phase motor is effciently operated by means of the phase-reversible fundamental-frequency component of the unidirectional output currents of the amplifier, as is now conventional and more fully described in my U. S. Patents Nos. 2,677,796 and 2,717,346.

The results of such an arrangement are that the actual voltage drop across the control windings is substantially zero within the operating range of the amplifier, that the balanced control circuit demands practically no energy from the error-signal source, aand that the effective input resistance of the control circuit is about 100 to 1000 times higher than the actual resistance of the control circuit. The self-balancing magnetic amplifier of the aforesaid patent exhibits high speed of response (about one half-cycle of the power supply frequency), unusual stability, linearity, and freedom from drift. In addition, it acts as an operational-type magnetic amplifier and does not impose its own characteristics on the associated feedback control system.

From the foregoing characteristics of the self-balancing magnetic amplifier of the aforesaid U. S. patent, it is apparent that a magnetic amplifier of the self-balancing type satisfies the requirements of a high-performance servo amplifier and lends itself admirably to applications in position-indicating synchro-transmission systems. However, when using D. C.-controlled, self-balancing magnetic amplifiers in connection with position servomechanisms, a phase-sensitive rectifier circuit must be provided to convert the phase-reversible A. C. error-signal voltage of the synchro-control transformer into a polarity-reversible D. C. signal voltage to be applied to the control circuit of the amplifier. Although various full-wave types of phase-sensitive rectifier circuits have been proposed for use in combination with the conventional magnetic amplifier circuits, it is to be noted that the use of phase-sensitive circuits with self-balancing magnetic amplifier circuitry poses problems which are non-existent in conventional magnetic amplfier applications. For example, if a phase-sensitive rectifier circuit is connected in the conventional manner in the control circuit of the self-balancing magnetic amplifier, the introduction of control signal currents in the control circuit of the amplifier will cause considerable disturbance of the electrical characteristics of the control circuit and upset the balance condition of the amplifier control circuit thereby nullifying the advantages derived from balanced control circuit conditions.

The present invention is directed to the concept of utilizing a single-stage, D. C.-controlled, push-pull self-balancing magnetic amplifier in combination with a phase-sensitive rectifier circuit which is energized with an alternating current error signal from a synchro-control transformer to therefrom derive and apply a D. C. polarity-reversible control signal to the input control circuit of the amplifier. In accordance with the teachings of this invention to make possible such a combination, there are provided novel forms of phase-sensitive rectifier circuits with auxiliary resistor elements for producing across these resistor elements a polarity-reversible D. C. signal voltage corresponding to the phase-reversible A. C. error-signal voltage of the synchro-control transformer of the position servomechanism. The resistor elements are connected across the output terminals of the phase-sensitive circuit and in closed series circuit relation with the control windings of the amplifier control circuit so that, under positive magnetic feedback and electrical negative feedback conditions, the amplifier control circuit remains in a balanced condition. In addition, the resistances of these resistor elements augment the actual control-circuit resistance to thereby reflect into the phase-sensitive circuit an effective impedance which is much greater than the actual control-circuit resistance, to thereby prevent loading down of the error-signal source and simultaneously increase the gain of the amplifier.

In a basic embodiment of the invention, it is contemplated to combine a phase-sensitive rectifier circuit, having auxiliary resistor elements connected across the output terminals thereof and which rectifier circuit may be one of several forms, with a single-stage, self-balancing, push-pull magnetic amplifier utilizing external feedback, the auxiliary resistors being connected in series circuit relationship in the control circuit of the amplifier. The push-pull magnetic amplifier is composed of two equally rated saturable-reactor systems having connected in their output circuit two negative-feedback resistors and the center-tapped control-winding elements of a two-phase A. C. induction-type reversible motor. The negative-feedback resistors are resistance-coupled into the control-circuit loop to supply a negative-feedback which highly degenerates the infinite gain produced by the positive external feedback.

In accordance with another embodiment of the invention, there is provided, in combination with any one of the novel phase-sensitive circuits proposed by the invention, a single-stage, self-balancing push-pull magnetic amplifier of the self-saturating type. In addition, error-rate damping is achieved in this embodiment by incorporating a differentiating network into the negative-feedback circuit of the amplifier.

In another form of the combination contemplated by the invention, a transformer is interposed between the amplifier output and the servo motor amplifier-field windings to thereby prevent quiescent currents from flowing through the motor amplifier-field windings. Also, the amplifier is connected to the A. C. operating source through a resistance network instead of through a coupling transformer.

In a preferred embodiment, the invention contemplates the combination, in self-balancing push-pull magnetic amplifier arrangements herein disclosed, of a pair of positive-feedback windings, connected in series with the voltage-dropping line resistors, in conjunction with additional feedback windings for producing fractional feedback turns. In this way, it is possible to use a very high resistance value of the regeneration-control resistor and to preserve the desired half-cycle response of the amplifier.

With the foregoing in mind, it is an object of the present invention to provide new and improved single-stage magnetic amplifier arrangements with position-indicating synchro-transmission systems of the type operated from an A. C. error signal.

Another object of the invention is to provide, in position servomechanism systems, a high-speed, single-stage magnetic servo amplifier in which the effective control current flowing through its control windings is substantially zero throughout the operating range of the amplifier.

A further object of the invention is to utilize, in high-performance servomechanism systems, a D. C.-controlled, single-stage, push-pull magnetic amplifier characterized by the combination of positive magnetic feedback and negative electric feedback.

A still further object of the present invention is the provision of an input control-winding circuit intercoupling the output of a phase-sensitive rectifier circuit to a self-balancing push-pull magnetic amplifier, the input circuit being characterized by a voltage drop thereacross which is substantially zero throughout the operating range of the magnetic amplifier and which input circuit presents to the phase-sensitive rectifier circuit an effective input impedance which is about 100 to 1000 times higher than the actual impedance thereof.

A still another object is to provide a D. C.-controlled, single-stage, push-pull, self-balancing magnetic amplifier capable of performing the functions which heretofore required several magnetic amplifier stages in high-performance servomechanism systems, and exhibiting a high speed of response of one half-cycle of the power supply frequency, unusual stability, linearity, and freedom from drift.

A primary object of the present invention is to provide, in magnetic servo amplifier arrangements having a high speed of response of one half-cycle of the power-supply frequency, an input control-winding circuit in which the actual impedance thereof is low but which presents a high impedance to the error signal source connected thereto, and wherein the effective control current flowing in the control windings is substantially zero so that negligible control current energy is dissipated therein to thereby result in a sufficiently high gain output as to require only a single-stage magnetic amplifier for position-servomechanism applications, the zero control current condition being additionally effective to minimize asymmetry zero-drift errors introduced by deviations from perfect symmetry of the saturable-reactor and rectifier components.

An important object of the invention is the provision of a novel input control-winding circuit which makes possible the combination of D. C.-controlled push-pull magnetic servo amplifier arrangements of the self-balancing potentiometer type with phase-sensitive rectifier circuits.

An essential object of this invention is to provide the combination of a single-stage, D.C.-controlled, push-pull, self-balancing magnetic servo amplifier with a phase-sensitive rectifier circuit having connected across the output terminals thereof auxiliary resistive means so arranged in circuit relationship with the control-winding circuit of the amplifier that the control-winding current is substantially zero within the total range of operation of the amplifier.

An essential object is to provide novel forms of phase-sensitive rectifier circuits with auxiliary resistance means connected as the output load therefor for producing thereacross a polarity-reversible D. C. signal voltage corresponding to the phase-reversible A. C. error-signal voltage applied thereto from the synchro-control transformer of a position servomechanism.

Yet another object of this invention is to provide, in combination with various forms of phase-sensitive rectifier circuits, a D. C.-controlled, single-stage, push-pull self-balancing magnetic amplifier circuit of either the external feedback or self-saturation type.

Yet another object is to provide, in a D. C.-controlled, single-stage, push-pull, self-balancing magnetic amplifier, the combination of a pair of positive-feedback windings in conductive circuit relationship in the line circuit of the amplifier and auxiliary feedback windings for producing fractional feedback turns to thereby enable use of a very high resistance value for the regeneration-control resistor whereby the high speed of response of the amplifier is preserved.

An ancillary object of the invention is to provide a novel type of self-balancing push-pull magnetic amplifier circuit in which the comparatively large power supply transformer is eliminated to reduce size and weight of the amplifier.

Another ancillary object is to provide, in the negative electric feedback channel of a self-balancing push-pull magnetic amplifier, an integrating network for eliminating the need of a tachometer generator, as is conventionally employed for stabilization of closed-loop servo systems.

Still further objects and the entire scope of applicability of the present invention will become apparent from the detailed description given hereinafter; it should be understood, however, that the detailed description and specific examples, while exemplifying preferred embodiments of the invention, are given by way of illustration only, since various changes and modification within the spirit and scope of the invention will become apparent to those skilled in the art from the following detailed description in conjunction with the accompanying drawings in which like reference characters designate like parts throughout the several figures thereof and wherein:

Fig. 2(*b*) illustrates the wave-forms of the resultant negative-feedback currents derived from the four half-cycle pulses of the amplifier of Figs. 1 and 3 and Fig. 2(*c*) illustrates the wave-forms of the negative-feedback currents of Figs. 9 and 10;

Fig. 4 is one form of a phase-sensitive rectifier circuit containing two full-wave bridge-type rectifiers and utilizing a pair of auxiliary resistors, arranged in accordance with the present invention and adaptable to apply a polarity-reversible D. C. signal voltage to the control-winding circuit of a self-balancing magnetic servo amplifier;

Fig. 5 is a transistor demodulator circuit with an auxiliary load resistor adaptable to apply a polarity-reversible D. C. signal voltage to a self-balancing magnetic amplifier;

Figure 11:
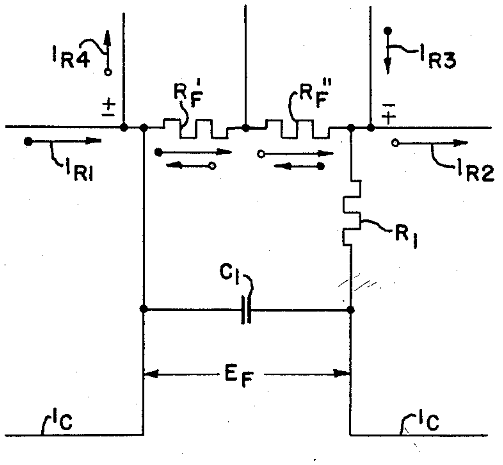
Figure 9:
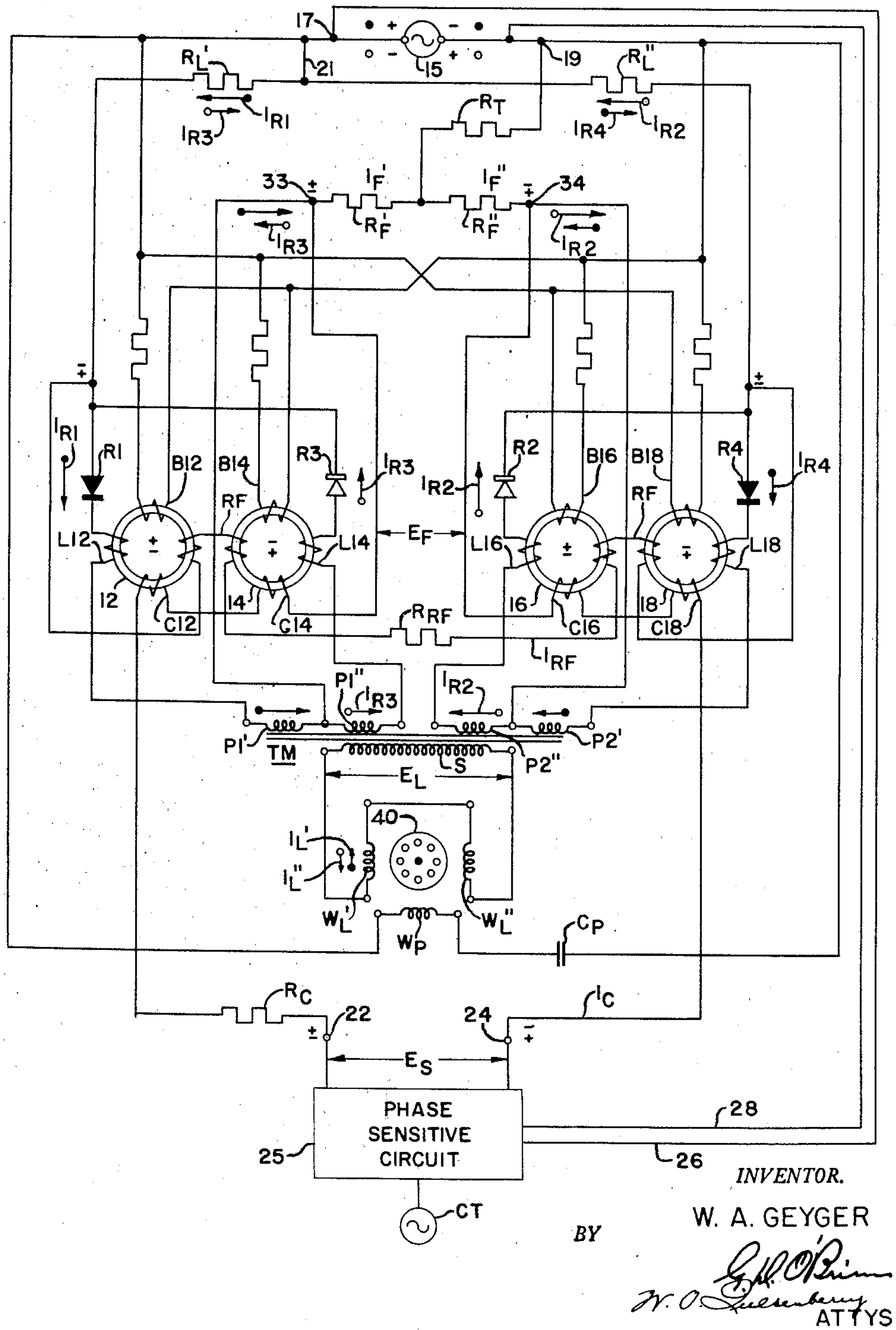
Fig. 9 is a modification of Fig. 3 and employs resistors for coupling the magnetic amplifier to the alternating current operating source and an output transformer for applying the output of the magnetic amplifier to the amplifier-field winding of the servo motor.
Figure 10:
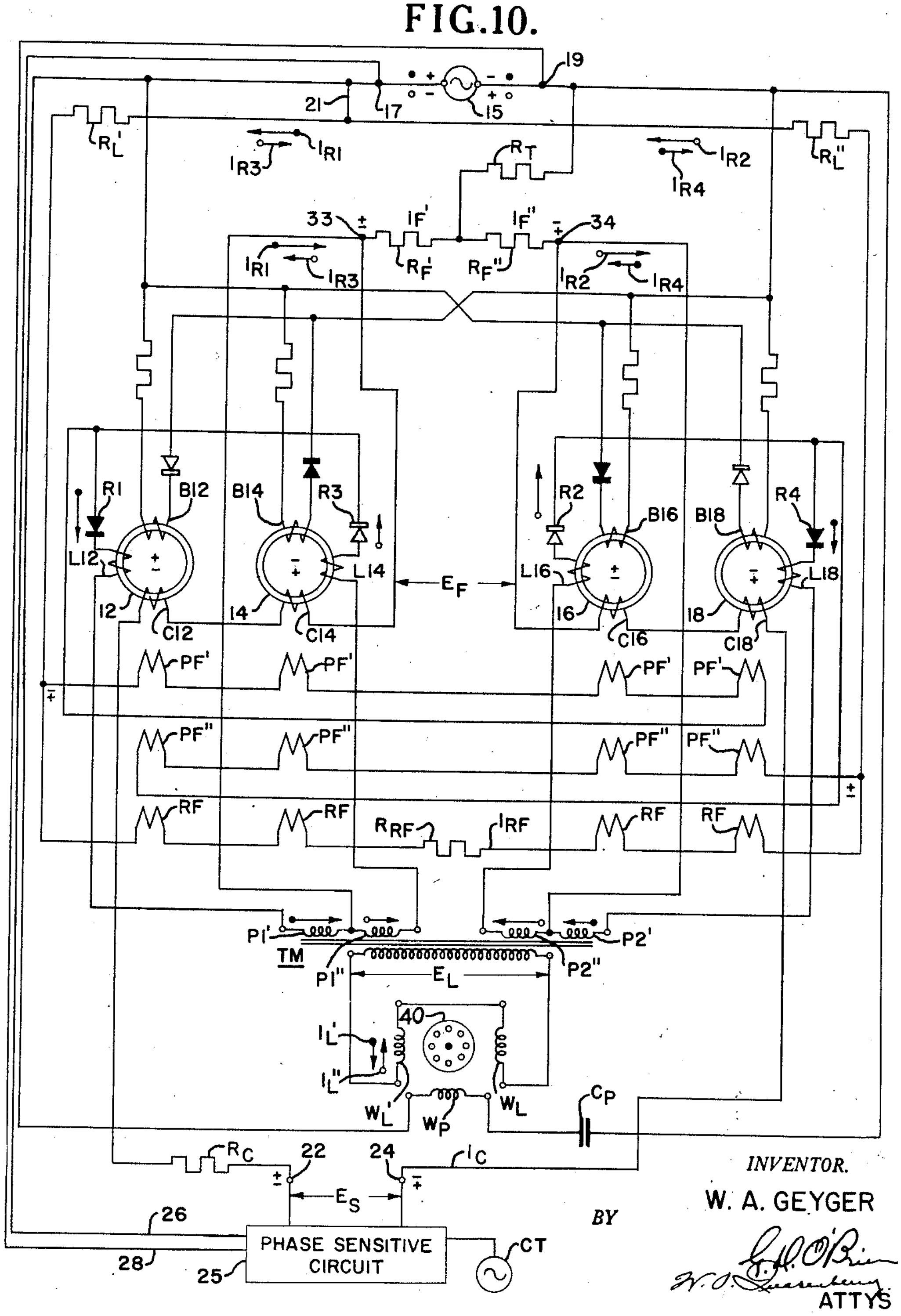

Fig. 10, a preferred form of the invention, is a modification of Fig. 9 and utilizes a pair of positive feedback channels in combination with an auxiliary feedback channel which produces fractional feedback turns for preserving the high speed of response of the amplifier; and Fig. 11 is a schematic circuit of the integrating network designed to eliminate the use of a tachometer for damping purposes.

Figure 1:
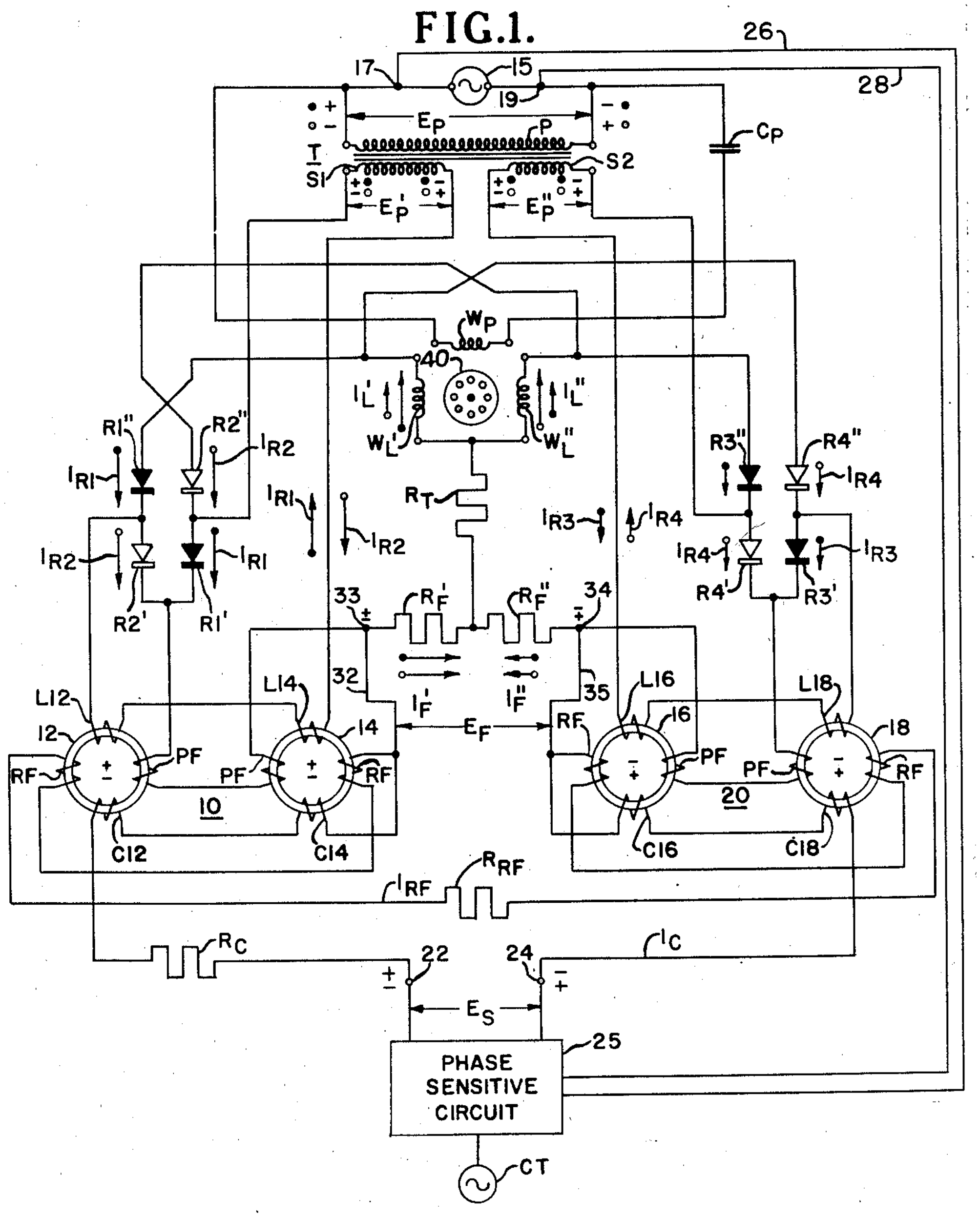
Fig. 1 is a position-indicating synchro-transmission system showing a wiring diagram of a D. C.-controlled, single-stage, push-pull self-balancing magnetic amplifier employing positive external feedback and negative electric feedback in combination with a phase-sensitive rectifier circuit, shown in block diagram, in accordance with the concept of the present invention.

Referring now to the drawings, wherein like reference characters designate like or corresponding parts through the several figures, there is shown in Fig. 1, which illustrates, in combination with an A. C. driven phase-sensitive rectifier circuit 25, the wiring diagram of a conventional push-pull self-balancing magnetic amplifier of the external feedback type, with two single-ended full-wave D. C. load circuits and a pair of equally rated saturable-reactor sections, indicated generally at 10 and 20 containing core reactors 12—14 and 16—18, respectively.

Reactor section 10 consists of a pair of core reactors 12 and 14, preferably of rectangular-hysteresis-loop core material, having series-aiding-connected A. C. load windings L12 and L14 respectively, series-opposing-connected D. C. control windings C12 and C14 respectively, series-opposing-connected external-feedback windings PF, and series-opposing-connected regenerative-feedback (boosting) windings RF, so that the voltages induced from the load circuits in each of D. C. twin windings C12—C14, PF, and RF by the fundamental wave and by the odd harmonics of the power supply voltage $E_P$, from an operating potential alternating current source 15 are opposed. The reactor section 20 consists of a pair of core reactors 16 and 18, also of rectangular-hysteresis-loop core material, having wound thereon series-aiding-connected A. C. load windings L16 and L18 respectively, series-opposing-connected D. C. control windings C16 and C18 respectively, series-opposing-connected external feedback windings PF, and series-opposing-connected regenerative-feedback wings RF the voltages induced therein from the load circuits being opposed as aforedescribed.

The two saturable-reactor systems 10 and 20 (the "plus-minus system" and the "minus-plus system") are energized in the usual way by means of a power supply transformer, indicated generally as T, having two separate secondary windings S1 and S2 for supplying voltages $E'_P$ and $E''_P$, induced therein by the primary winding P which is connected across alternating-current source 15 supplying voltage $E_P$. The push-pull system, 10 and 20, is arranged to control a two-phase induction motor 40 having line-field winding $W_P$ with series phasing capacitor $C_P$ connected directly across A. C. source 15. The external-feedback winding PF and the amplifier-field winding components $W'_L$ and $W''_L$ of the separately excited two-phase motor 40 are supplied from the half-wave rectifier elements, R1'—R1", R2'—R2", R3'—R3", and R4'—R4", with variable unidirectional full-wave currents $I'_L$ and $I''_L$ (average values) in such a way that the resultant D. C. and A. C. components of the four variable half-cycle pulses, $I_{R1}$ to $I_{R4}$, are polarity-reversible and are zero at zero input. A pair of resistors $R'_F$ and $R''_F$ are serially connected across terminals 33 and 34 to serve as negative-feedback resistors, with a current limiting resistor $R_T$ having one end connected to the common junction of the feedback resistors and the other end to the amplifier-field windings $W'_L$ and $W''_L$.

The load windings, L12 and L14, are energized by an alternating-current voltage $E'_P$ from secondary winding S1 through half-wave rectifier elements R1'—R1" and R2'—R2" so that half-wave current pulses $I_{R1}$ flow through rectifiers R1'—R1" and load windings L12 and L14 during alternate half-cycles of the supply voltage $E_P$ and so that current pulses $I_{R2}$ flow through rectifiers R2'—R2" and load windings L12 and L14 during the other alternate half cycles of the supply voltage $E_P$, these half-wave currents flowing in addition through the external feedback windings PF on core reactors 12 and 14 and through the negative-feedback resistor $R'_F$ and the motor amplifier-field winding components $W'_L$ and $W''_L$. The current flow through saturable-reactor section 10 on successive half cycles of the A. C. supply source 15 can be traced in the following manner. Assuming terminal 17 of source 15 to be positive, the current flow is from the positive end of secondary winding S1 through rectifier R1', external feedback windings PF on cores 12 and 14, feedback resistor $R'_F$ and resistor $R_T$, amplifier-field winding $W'_L$, rectifier R1", load windings L12 and L14, and back to the other end of winding S1. On the negative half cycle of source 15 when terminal 19 becomes positive, the current flow is from the positive end (as indicated by the white dot) of winding S1 through load windings L14 and L12, rectifier R2', external feedback windings PF on cores 12 and 14, feedback resistor $R'_F$ and resistor $R_T$, amplifier-field winding $W''_L$, and rectifier R2" back to the other side of secondary winding S1. The load winding energization and half-wave current pulses flowing through saturable reactor section 20 can be analyzed in a similar manner to show the conductive paths of half-wave current pulses $I_{R3}$ and $I_{R4}$.

The graphical symbols of Fig. 1, which are presented in such a manner as to facilitate the comprehension of the overall actual mode of operation of the magnetic-amplifier circuit, show that the black rectifiers are conducting simultaneously during the first half-cycle (black polarities) of power supply voltage $E_P$ to derive half-wave current components $I_{R1}$ and $I_{R3}$ while the white rectifiers conduct simultaneously during the second half-cycle period of $E_P$ (white polarities) to derive the half-wave current components $I_{R2}$ and $I_{R4}$. Thus, the feedback resistors $R'_F$ and $R''_F$ will carry unidirectional full-wave currents $I'_F=I_{R1}+I_{R2}$ and $I''_F=I_{R3}+I_{R4}$, whereas the twin-load motor windings $W'_L$ and $W''_L$ are supplied with unidirectional full-wave currents $I'_L=I_{R1}+I_{R4}$ and $I''_L=I_{R2}+I_{R3}$, as illustrated by the arrowed-lines representing the current components. The lengths of the arrowed-lines represent the magnitude of their respective half-wave current components and, as illustrated in Fig. 1, are based upon the assumption that the polarity-reversible D. C. control signal applied across input terminals 22 and 24 from phase-sensitive circuit 25 presents a signal which is positive at terminal 22. Although resistor $R_T$, carrying total current $I_T=I_{R1}+I_{R2}+I_{R3}+I_{R4}$, is provided to limit actual magnitude of this current to a proper value, the inclusion of this resistor in the circuit of Fig. 1 is optional and may be omitted without adversely affecting the operation thereof.

Positive magnetic feedback is obtained in the amplifier circuit of Fig. 1 from the current components flowing through the external feedback windings PF on core reactors 12, 14, 16 and 18. Negative electric feedback (degenerative feedback) is derived from the current components appearing across the negative feedback resistors $R'_F$ and $R''_F$ which are connected in series circuit relation with the control windings C12—C14 and C16—C18 to thereby cause a compensating current $I_F=I'_F-I''_F$ to flow through the control windings in a direction opposite to the direction of flow of control current $I_C$ applied thereto from phase-sensitive circuit 25. Regenerative feedback (boosting) windings RF in series with a regenerative control resistor $R_{RF}$ are are connected across resistors $R'_F$ and $R''_F$ by way of conductors 32 and 35 to thereby receive the feedback voltage drop $E_F$ appearing across these resistors. A regenerative feedback current $I_{RF}$, derived from the voltage drop $E_F$, flows through the regenerative feedback windings RF, whereupon the regenerative feedback windings are effective to exercise an additional regenerative feedback effect to provide infinite internal gain in the amplifier circuit. By proper selection of the value of regenerative-control resistor $R_{RF}$, it is possible to compensate for the departure of the half-wave rectifier elements from ideal characteristics to thereby obtain critical regeneration or compensated feedback.

Control is provided for the saturable-reactor sections 10 and 20 from a phase-sensitive rectifier circuit 25, which is operable to produce, for application to the control circuit of the push-pull sections 10 and 20, a polarity-reversible D. C. control signal correlative in phase sense and magnitude with the polarity and amplitude of an A. C. error signal applied thereto from a synchro-control transformer, indicated as CT. Control windings C12, C14, C16 and C18 are arranged on their respective core reactors so that for a given polarity of the D. C. control signal $I_C$, the control ampere turns will differentially vary the impedances of the reactors in reactor sections 10 and 20 during each half cycle of the supply voltage $E_P$.

With critical regenerative feedback obtained by proper selection of the value of resistor $R_{RF}$, the polarity-reversible D. C. control current $I_C$ will be self-balanced by the variable polarity-reversible compensating current $$I_F=(I'_F-I''_F)$$

from the current components $I'_F$ and $I''_F$ appearing across resistors $R'_F$ and $R''_F$ which compensating current is resistance-coupled serially in the control windings circuit. The resultant A. C. load current $I_L$ kowing through the amplifier-field windings of motor 40 is effective to perform operational control of the motor 40 in a manner corresponding to the input error signal and is zero for zero input current conditions. Thus, the control circuit operates under current balance conditions in which the D. C. control signal $I_C$ exercises only a transient type of control, and the magnetic amplifier demands practically zero power from the current source 25. Thus, in this manner, the amplifier circuit of Fig. 1 is adapted for operation on a D. C. control signal of either polarity and delivers an A. C. output signal correlative in phase and amplitude with the sign and magnitude of the input error signal.

Figure 3:
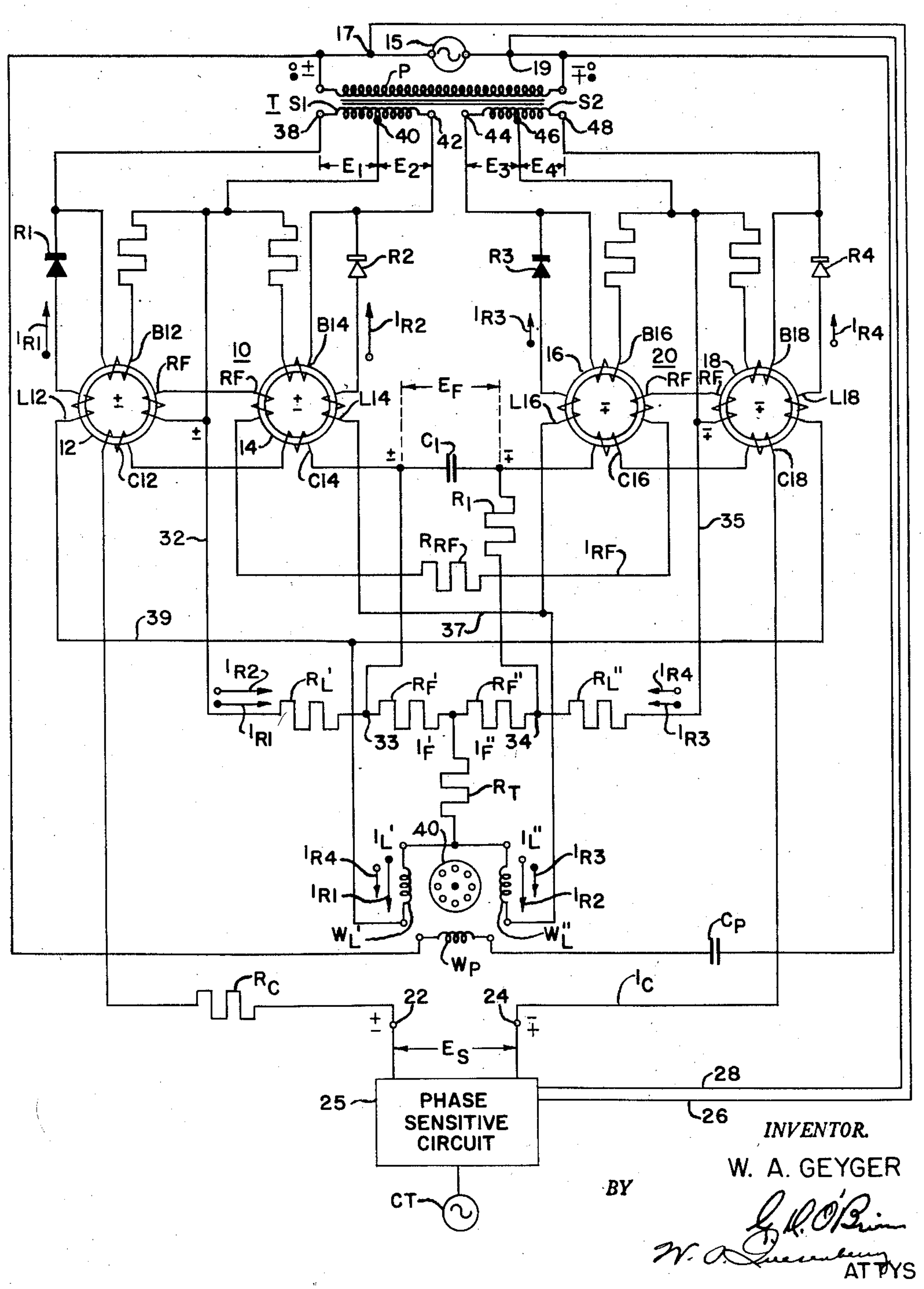
Fig. 3 is a modification of Fig. 1 utilizing self-saturation in lieu of positive external feedback.

Although not shown in Fig. 1, proper quiescent current values of the output currents of the balance saturable-reactor systems 10 and 20 are established in the usual way by means of separate D. C. or A. C. bias circuits. Preferably, bias windings with four series-connected variable resistors, as shown in Fig. 3 and subsequently to be described, may be employed for this purpose in Fig. 1. Application of properly rated D. C. bias circuits offers the significant possibility of operating these arrangements under Class B push-pull conditions with Class B operation. The circuit itself is the same as that for Class A operation, except that the four saturable-reactor elements are biased approximately to cut-off. Operated in this manner, the stand-by power may be reduced to a relatively small value; and the A. C. power source supplies energy only when a signal voltage $\pm E_F$ is applied. Actually, the total power dissipation of such an arrangement with Class B operation is about 10 to 20 percent with that of Class A operation.

Figure 2A:
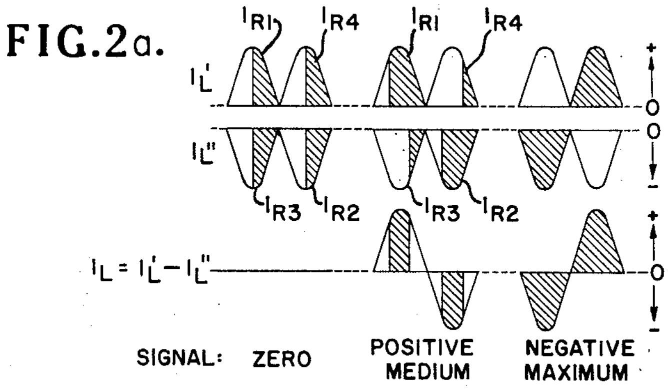
Fig. 2(*a*) illustrates the wave-forms of the resultant motor currents from the four half-cycles pulses of the amplifier of Figs. 1 and 3.
Figure 2B:
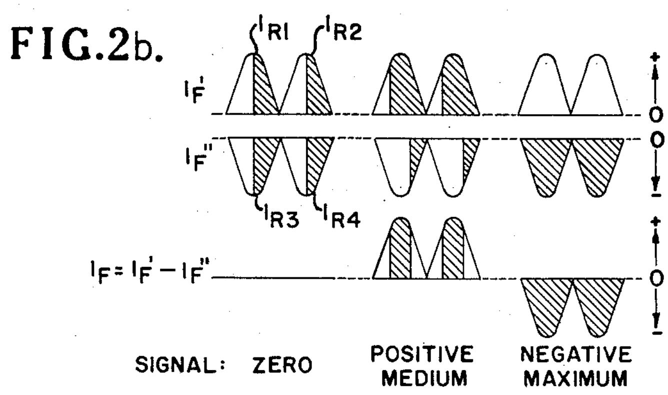

Referring to Figs. 2(*a*) and 2(*b*) for a better understanding of the electrical phenomena appearing in the amplifier circuit, the wave-forms of Figs. 2(*a*) and 2(*b*) illustrate the mode of operation of the self-balancing external-feedback circuit of Fig. 1 with regard to the two-phase motor 40. Fig. 2(*a*) shows the variations of the average values of the four half-cycle pulses, $I_{R1}$ to $I_{R4}$, and the wave-forms of the resultant motor-winding load currents $L'_L$, $I''_L$ and $I'_L-I'_L$ for the typical example that with no signal conditions $E_S$ [$E_S=0$] the pulses $I_{R1}$ to $I_{R4}$ have 50% of their maximum value, i. e., the firing angle of the four saturable-reactor elements is 90°. Fig. 2(*b*) shows the wave-forms of the negative-feedback current components $I'_F$ and $I''_F$, as derived from the half-cycle pulses $I_{R1}$ to $I_{R4}$ and the resultant effective negative-feedback current $I_F=[I'_F-I''_F]$ which produces the negative electrical feedback effects.

From an analysis of Fig. 2(*a*) it is evident that, with $E_S=0$, the average values $I_{R1}$ and $I_{R4}$, and also $I_{R2}$ and $I_{R3}$ are equal and that the fundamental-frequency components of $I'_L$ and $I''_L$ are zero, with the result that $I'_L-I''_L=0$. When a positive control voltage $E_S$ is applied [when terminal 22 is positive], the pulses $I_{R1}$ and $I_{R2}$ of the "plus-minus" will increase while the pulses $I_{R3}$ and $I_{R4}$ of the minus-plus system will decrease; and there is a resultant "positive" fundamental-frequency load current $I'_L-I''_L$, which is a function of the magnitude of a negative input signal. However, when the polarity of the D. C. control signal from phase-sensitive circuit 25 is reversed so that terminal 24 is positive, the pulses $I_{R1}$ and $I_{R2}$ will decrease and the pulses $I_{R3}$ and $I_{R4}$ will increase; and there is a resultant "negative" fundamental-frequency load current $I'_L-I''_L$, which is a function of the magnitude of a negative input signal.

In considering the waveforms of Fig. 2(*b*) in the same manner, it is to be noted that under zero signal conditions, the negative feedback is zero and that, under control signal conditions, the negative-feedback resistors $R'_F$ and $R''_F$ are effective to produce unidirectional, full-wave, polarity-reversible negative-feedback voltage $E_F$ which opposes the signal voltage $E_S$.

Thus, the external-feedback circuit of Fig. 1 will operate the separately excited two-phase motor 40 in the usual way by means of pure, phase-reversible alternating current $I'_L-I''_L$ (substantially without D. C. component), while the feedback resistors $R'_F$ and $R''_F$ will produce the unidirectional full-wave, polarity-reversible negative-feedback voltage $E_F=I_FR_F=I'_FR'_F-I''_FR''_F$ in the control-circuit loop of the amplifier. In this case, with $R'_F=R''_F=R_F$, the expression $$\frac{1}{R_F}=\frac{I'_F-I''_F}{E_F}=\frac{I'_FI''_F}{E_S}$$

represents the "transconductance" of the circuit with regard to the feedback resistors.

The phase-sensitive circuit 25, shown in block diagram form and which applies the D. C. control signal to the amplifier, may be one of many forms of phase-sensitive circuits of which several are hereinafter described and is constructed as to be energized with an A. C. error signal from a synchro-control transformer CT and by a constant reference voltage with which the A. C. error signal is compared in phase and magnitude. The constant reference voltage is supplied from the power supply source 15 through leads 26 and 28 connected across the output terminals 17 and 19 of source 15. For reasons subsequently to become apparent, the phase-sensitive circuits are basically conventional with modifications therein in accordance with the concept of the invention.

In order to take advantage of the specific properties of self-saturating (internal feedback) circuits, the two single-ended external feedback systems of Fig. 1 may be replaced by two single-ended "full-wave" D. C. load systems each having only two half-wave rectifier units and a pair of center-tapped power-supply winding as shown in Fig. 3, which is constructed similarly to Fig. 1 with like reference numerals designating similar elements. In Fig. 3, the power-supply transformer T, combining the "plus-minus system" and the "minus-plus system," has two separate center-tapped secondary winding S1 and S2 which supply voltages $E_1$ to $E_4$. In accordance with conventional forms of self-saturating push-pull circuits with four saturable-reactor elements, this arrangement contains only four half-wave rectifier units R1, R2, R3 and R4.

The windings on saturable-reactor sections 10 and 20 of Fig. 3 are the same as those of Fig. 1 with the exception that the circuit of Fig. 3 does not employ external-feedback windings. Bias winding circuits, which are not shown in Fig. 1, are designated by the reference characters B12, B14, B16 and B18 and are respectively energized from voltages $E_1$, $E_2$, $E_3$ and $E_4$ appearing across terminals 38—40, 40—42, 44—46, and 46—48, respectively. It is also to be noted that in Fig. 3 the polarity indications across terminals 17 and 19 of source 15 are the reverse of those shown in Fig. 1.

In tracing the conductive paths of the half-cycle current pulses $I_{R1}$ to $I_{R4}$ and assuming terminal 17 to be positive, the conductive path of current pulse $I_{R2}$ is from center-tap terminal 40 of secondary winding S1 through line resistor $R'_L$ negative-feedback resistor $R'_F$ and limiting resistor RT, motor winding $W''_L$, lead 37, load winding L14, and through rectifier R2 to terminal 42. The conductive path of current component $I_{R4}$ may be traced in a similar manner from center-tap terminal 46 to terminal 48 of secondary winding S2. During the next half cycle when terminal 19 becomes positive, the conductive path of current component $I_{R1}$ is traced from center-tap terminal 40 of secondary winding S1 through line resistor $R'_L$, negative feedback resistor $R'_F$ and limiting resistor $R_T$, motor winding $W'_L$ through lead 39 to load winding L12 and rectifier R1 to terminal 38 of secondary winding S1, the conductive path of current component $I_{R3}$ being similarly traced between terminal 46 and 44 of secondary winding S2. The mode of operation of the self-saturating circuit of Fig. 3 with regard to the two-phase motor 40 and the external feedback resistors $R'_F$ and $R''_F$ is essentially the same as that of the external feedback circuit of Fig. 1, with the wave forms of Figs. 2(*a*) and 2(*b*) serving to illustrate also the mode of operation of the circuit of Fig. 3.

Since it is known that the transient-response characteristics of self-balancing magnetic amplifiers may be altered materially by introducing frequency-sensitive components, such as capacitive or inductive components, into the degeneration network of the amplifier itself, the inclusion of capacitive or inductive components in the degeneration network of the self-balancing magnetic amplifier can be utilized to achieve special compensating effects by designing the degeneration network in such a way that impedance values of this network are a function of the voltage, current, temperature, or time (derivative-feedback effects, etc.). The arrangement of Fig. 3 employs an integrating circuit, consisting of capacitor $C_I$ and resistor $R_I$, in the negative-feedback channel of the amplifier for achieving error-rate damping or compensation of the closed-loop servo system. As an alternative, a differentiating network may be employed in the feedback channel instead of an integrating network for achieving error-rate damping or compensation. A differentiating network for this purpose may be readily obtained by connecting a properly rated capacitor across the terminals of the regeneration-control resistor $R_{RF}$. If desired, both the aforedescribed integrating network and differentiating network in combination may be employed in the feedback channel for the purpose of obtaining special compensating effects. In this way, by introducing differentiating and/or integrating networks into the feedback channels of the self-balancing amplifier itself, it is possible to eliminate the tachometer generator, which is conventionally used for stabilization of the closed-loop servo systems. Although the inclusion of differentiating and/or integrating networks are shown in Fig. 3, it is to be understood that such networks may also be employed in the circuit of Fig. 1 by connecting such networks as aforedescribed with respect to Fig. 3.

In addition to the self-saturating arrangement of Fig. 3, another possibility for designing self-balancing magnetic amplifier circuits utilizing self-saturation consists in employing special saturable-reactor control "modulator circuits," which are derived from the original form of voltage-control modulator circuits without saturable reactor components. Ring modulator circuits based upon the original form of the ring modulator, or star modulator circuits based on the original form of the star modulator, may be used for this purpose.

When using D. C. voltage-controlled, self-balancing magnetic amplifiers of Figs. 1 and 3 in connection with position servomechanisms, a phase-sensitive rectifier circuit 25 must be provided to convert the phase-reversible A. C. error-signal voltage of the synchro-control transformer CT into a polarity-reversible D. C. signal voltage, $\pm E_S$, to be applied to the control-winding circuit of the self-balancing magnetic amplifier. However, when using phase-sensitive circuits in conjunction with magnetic amplifiers of the self-balancing type, the polarity-reversible D. C. output of a phase-sensitive circuit cannot be applied directly to the control-winding circuit of the amplifier as is the practice in conventional systems, since the inclusion of the phase-sensitive circuit with its asymmetrical elements would upset the balance condition of the control-winding circuit of the amplifier, thereby nullifying the benefits derived from self-balancing circuitry.

Therefore, in order to make feasible the combination of phase-sensitive circuits with self-balancing magnetic amplifiers, resistive means are connected across the output of the phase-sensitive circuit, as will subsequently become apparent from the description of Figs. 4, 5 and 6, to serve as intermediary means in transferring the output of the phase sensitive circuit to the input control windings circuit of the amplifier. In this manner, the current flowing through the control windings of the magnetic amplifier is the current derived from the voltage drop across the auxiliary resistive means and not directly from the output voltage of the phase-sensitive circuit. It is to be noted that this manner of applying the D. C. control signal is in contrast to the usual method, where the full polarity-reversible direct output current of the phase-sensitive circuit flows through the control windings of the amplifier.

Fig. 4 illustrates a phase-sensitive rectifier circuit which may be used as the phase-sensitive circuit 25 in either Figs. 1 or 3. The phase-sensitive rectifier circuit of Fig. 4 is energized with an A. C. error signal $E_T$ from the synchro-control transformer CT through a reference-voltage transformer TR which is of supermalloy core material and has a pair of secondary windings. The constant reference A. C. voltage to be compared with the A. C. error signal is applied to the phase-sensitive circuit form power supply source 15 through a transformer TP which is of ordinary core material and has a pair of secondary windings. During the first half-cycle of source 15 for the polarities shown, the A. C. voltage $E'_{CT}$ appearing across one of the secondary windings of transformer TR is differentially combined with the voltage $E_P'$ of transformer TP by means of a full-wave bridge-type rectifier circuit 50; whereas the A. C. voltage $E_{CT}''$ is additively combined with the voltage $E_P''$ of transformer TP by full-wave bridge-type rectifier 60. The outputs of bridge-rectifiers 50 and 60 are applied across the auxiliary resistors $R_A'$ and $R_A''$, respectively, which auxiliary resistors are serially connected across the outut terminals of the phase-sensitive circuit 25 and in series circuit relationship with the control windings of the self-balancing magnetic amplifier.

The operation of this circuit is based upon the fact that D. C. voltage drop $E_S'$ across auxiliary resistor $R'_A$ is proportional to the difference of A. C. voltages $E'_P$ and $E'_{CT}$, whereas the D. C. voltage drop $E''_S$ across auxiliary resistor $R''_A$ is proportional to the sum of A. C. voltages $E''_P$ and $E''_{CT}$. It is to be noted that the voltage drops appearing across auxiliary resistors $R'_A$ and $R''_A$ are in polarity opposing relationship and that, therefore, the output voltage $E_S$ applied across the input terminals 22—24 of the magnetic amplifier control circuit is equal to the difference between $E'_S$ and $E''_S$ and will assume the predominant polarity. If the reference voltages $E'_P=E''_P=K\times E_P$ are either in phase or 180° out of phase with the signal voltages $E'_{CT}=E''_{CT}=K\times E_{CT}$, and if these reference voltages are slightly larger than the maximum value of the signal voltages, then the polarity-reversible D. C. signal voltage, $\pm E_S$, applied to the control circuit of the amplifier, will be proportional to the phase-reversible A. C. error signal voltage $\pm E_{CT}$ of the synchro-control transformer CT.

Referring now to Fig. 5, wherein is shown a transistor demodulator circuit operating in a manner similar to the circuit of Fig. 4, with like elements having corresponding reference numerals, a pair of dual PNP type transistor circuits, indicated generally as 65 and 70, are used to perform the same combining operations performed by rectifier circuits 50 and 60 of Fig. 4. The transistors 65 and 70 have a Zener voltage of 42 volts and are used as switches. When employing the transistor demodulator of Fig. 5 in connection with self-balancing magnetic amplifiers, only a single auxiliary resistor $R_A$ is required to apply a polarity-reversible D. C. control voltage $\pm E_S$ to the input of the amplifier.

Figure 6:
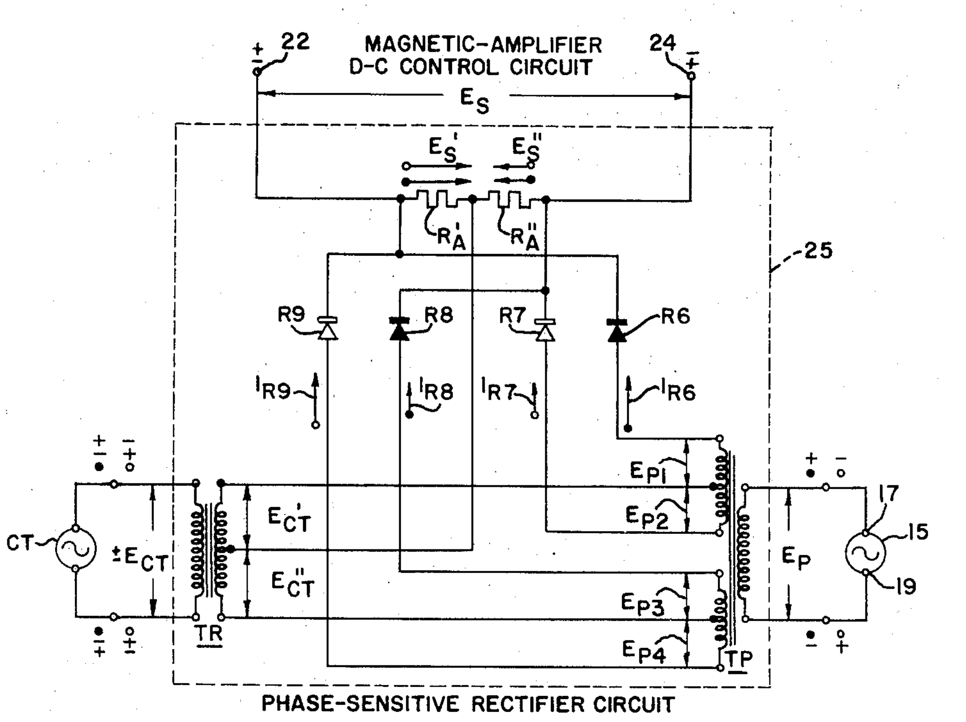
Fig. 6 is the circuit diagram of a star-modulator type of phase-sensitive rectifier circuit containing a pair of output auxiliary resistors, arranged in accordance with the invention and adaptable to apply a polarity-reversible D. C. signal voltage to the control-winding circuit of a self-balancing magnetic amplifier.

Fig. 6 shows the circuit diagram of a star-modulator full-wave type of phase-sensitive circuit for converting the phase-reversible A. C. error-signal voltage, $\pm E_{CT}$, of the synchro-control transformer CT into a polarity-reversible D. C. signal voltage $\pm E_S$. The A. C. error signal voltage $E_{CT}$ is applied through a signal-voltage transformer TR, of supermalloy core material, having a center-tapped secondary across which appear the A. C. voltages $E'_{CT}$ and $E''_{CT}$; and, the constant reference voltage is applied through a reference-voltage transformer TP, of ordinary core material, having a pair of center-tapped secondary windings across which appear the reference voltages $E_{P1}$, $E_{P2}$, $E_{P3}$, and $E_{P4}$. Four rectifiers R6 and R9, of the silicon or dry-disk type, interconnect the secondary windings of transformers TR, TP in such a manner as to develop four half-cycle current components $I_{R6}$ to $I_{R9}$ across the auxiliary resistors $R'_A$ and $R''_A$ which are serially connected across the output terminals 22 and 24 of the star-modulator circuit. During the half-cycle of source 15 when terminal 17 is positive, the rectifier R6 additively combines the voltages $E_{P1}$ and $E_{CT'}$ to derive the current component $I_{R6}$ appearing across resistor $R'_A$, while rectifier R8 differentially combines the voltages $E_{P3}$ and $E''_{CT}$ to derive the current component $I_{RS}$ which appears across auxiliary resistor $R''_A$. On the negative half-cycle of power supply source 15 when terminal 19 becomes positive, rectifiers R7 and R9 are operable to compare A. C. voltage $E_{P2}$ with $E'_{CT}$ and to compare voltage $E_{P4}$ with $E''_{CT}$, respectively, to develop across auxiliary resistors $R'_A$ and $R''_A$ current components $I_{R9}$ and $I_{R6}$, respectively.

In operation, if the reference voltages $$E_{P1}=E_{P2}=E_{P3}=E_{P4}=K\times E_P$$

are either in phase or 180° out of phase with the signal voltages $E'_{CT}=E''_{CT}=K\times E_{CT}$, and if these reference voltages are larger than the maximum value of the signal voltages, then the polarity-reversible D. C. signal voltage $\pm E_{CT}$, applied to the input control circuit of a self-balancing magnetic amplifier, will be proportional to the phase-reversible A. C. error-signal voltage $\pm E_{CT}$, of the synchro-control transformer CT. It is to be noted that the current components developed across resistors $R'_A$ and $R''_A$, on each half cycle of the power source 15, are in polarity opposition and that therefore the polarity-reversible D. C. control signal $E_S$ is equal to the difference of D. C. voltages $E'_S$ and $E''_S$.

Although any one of the phase-sensitive circuits of Figs. 4, 5 and 6 may be employed with the self-balancing magnetic amplifiers of Figs. 1 and 3 and of the Figs. 9 and 10 subsequently to be described, it is to be noted that the essence of the inventive concept is in the utilization of the resistive means connected across the output of the phase-sensitive circuit and in closed series circuit relationship with the input control winding circuit of the magnetic amplifier. It is utilization of this specific resistive means as intermediary coupling elements which enables the possibility of combining phase-sensitive circuits with self-balancing magnetic amplifiers to preserve the balance condition of the input control winding circuit of the amplifier. Although several forms of phase-sensitive circuits in combination with auxiliary resistor elements are herein disclosed for controlling the self-balancing magnetic servo amplifier in such a way that the control-winding current is substantially zero, it is to be understood that the invention may be practiced with phase-sensitive circuits other than those herein described, contingent upon the utilization therewith of auxiliary resistive means employed in the manner herein taught.

In summarizing the capabilities of the self-balancing arrangements of Figs. 1 and 3 for servo application where a high speed of response of the amplifier is of paramount importance, the application of the fundamental principle of the single-stage self-balancing magnetic amplifier, i. e. combination of positive magnetic feedback and negative electric feedback, offers the possibility of reducing actual response time of the amplifier to its minimum value of one half-cycle of the power supply frequency by introducing 100% negative feedback without employing any rectifier components in the control circuit of the amplifier. Analysis of the external-feedback circuit of Fig. 1 reveals that half-cycle response will be obtained if turns ratio $N_C/N_L+N_F$ is approximately equal to the resistance ratio $R_F/R_O$, where $R_F=R'_F=R''_F$ is the actual resistance of the negative-feedback resistors and $R_O$ is internal resistance of each single-ended output circuit including the load-resistance components, copper resistance of the A. C. load windings $N_L$ and the external feedback windings $N_F$ and forward resistance of the rectifier units. In a similar way it can be shown that, in the self-saturating circuit of Fig. 3, half-cycle response will be secured by making turns ratio $N_C/N_F$ approximately equal to the resistance $R_F/R_O$.

Figure 8:
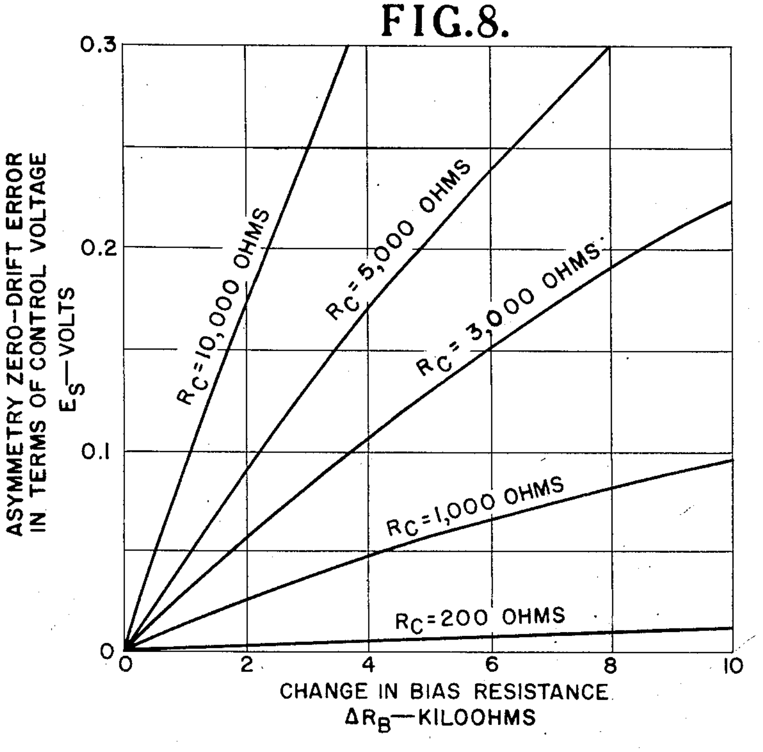
Fig. 8 is a performance characteristic of magnetic amplifiers illustrating the effects on asymmetry zero-drift errors by various values of the total control circuit resistance.

In order to illustrate the significant effect of drift-error reduction and self-balancing magnetic servo amplifiers, actual value of the asymmetry zero-drift error, expressed in terms of D. C. signal voltage $E_S$, has been measured providing the same voltage of the amplifier in all cases but with various total-resistance values $R_C$ of the control circuit, and with various amounts of asymmetry. Fig. 8, which presents the results of such measurements, illustrates the measured values of the drift-error expressed in terms of $E_S$ as a function of bias-resistor variation $\Delta R_B$ with the control-circuit resistance $R_C$ as a parameter. These results show in a dramatic way that when the total control-circuit resistance presented to the magnetic amplifier is reduced to the order of 100 to 200 ohms as a result of the self-balancing operating conditions, the actual magnitude of the asymmetry zero-drift error is reduced to about 1/40 of its original value. This, of course, also is true when the asymmetry of the push-pull circuit is caused by other effects such as variations of the characteristics of the saturable-reactor and rectifier components. Therefore, it is manifestly evident that the aforedescribed combination of phase-sensitive circuit with a self-balancing magnetic amplifier lends itself admirably for servo remote positioning applications.

In order to reduce size and weight of the self-balancing magnetic amplifiers of the type herein disclosed, the comparatively large power-supply transformer T of Figs. 1 and 3 may be eliminated. Also, in order to prevent quiescent currents from flowing through the motor field windings $W'_L$ and $W''_L$, an output transformer having a pair of center-tapped primary windings may be employed to intercouple the output of the magnetic amplifier with the servo motor. Such an arrangement is shown in Fig. 9, which is a modification of the self-saturating self-balancing circuit of Fig. 3. Elimination of the power supply transformer T is made possible in the arrangement of Fig. 9 by employing a special form of double-bridge type of self-saturating push-pull amplifier with two pairs of feedback resistors $R'_F$, $R''_F$ and $R'_L$, $R''_L$, in the line circuit. For applying the output to the servo motor 40, an output coupling transformer TM having a pair of split center-tapped primary windings, P1'—P1'' and P2'—P2'', connected in circuit relationship with the saturable-reactor sections of the magnetic amplifier and having the secondary winding S connected across the motor amplifier-windings $W'_L$ and $W''_L$, drive motor 40.

Figure 2C:
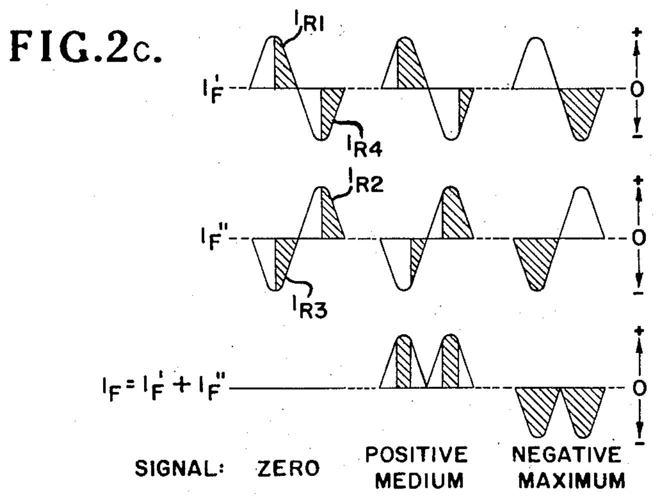

Fig. 9, being a modification of Fig. 3 with like reference numerals designating corresponding components, operates in substantially the same manner as Fig. 3 with the exception that the current components flowing through feedback resistor $R'_F$ are in opposition and the current components flowing through feedback resistor $R''_F$ are also in opposition, as will become more apparent from an inspection of Fig. 2(c). As in Fig. 3, the arrangement of Fig. 9 shows bias windings B12, B14, B16 and B18 to provide the operating flux level of the core reactors and has the regenerative feedback circuit windings RF connected serially across the opposite terminals of line resistors $R'_L$ and $R''_L$.

In operation and during the half cycle when terminal 17 of source 15 is positive, the current component $I_{R1}$ flowing through resistor $R'_L$ may be traced through rectifier R1, load winding L12, primary winding section P1', through feedback resistor $R'_F$ and limiting resistor $R_T$ to the other side of source 15 at terminal 19. The current component $I_{R4}$ flowing through feedback resistor $R''_L$ follows the path through rectifier R4, load winding L18, primary winding section P2' through feedback resistor $R''_F$ and limiting resistor $R_T$ to terminal 19 of source 15. The current components $I_{R2}$ and $I_{R3}$ may be similarly traced during the next half-cycle when terminal 19 is positive from terminal 19 through resistor RT and in separate branches through feedback resistor $R'_F$ and $R''_F$, as indicated by the arrowed lines having the white-circled ends.

As can be seen from the flow of current components through the primary winding sections of transformer TM, the current components $I_{R1}$ and $I_{R4}$ being equal under zero control signal conditions will cancel each other out and no current will be induced in the secondary winding S of transformer TM; the current components $I_{R2}$ and $I_{R3}$ also cancel each other during the next half-cycle of source 15 under no-signal conditions. Therefore, in this manner, no quiescent currents flow through the motor windings $W'_L$ and $W''_L$ under zero signal conditions.

The mode of operation of the self-balancing circuit of Fig. 9 with respect to the two phase motor 40 is the same as that of Fig. 3 with the wave forms of Fig. 2(a) serving to illustrate the wave forms of the resultant motor-winding load current $I'_L$ and $I''_L$. However, in contrast to the feedback operation of Fig. 3, the current components appearing across the feedback resistor $R'_F$ and $R''_F$ are in opposition. The effect of this type of operation may be readily appreciated by referring to Fig. 2(c) wherein is shown the derivation of negative feedback currents $I'_F$ and $I''_F$ and the resultant negative feedback current $I_F$. It is to be noted that, in contradistinction to Fig. 3 where the feedback current $I_F$ is the difference of the current components $I'_F$ and $I''_F$, the feedback current $I_F$ of Fig. 9 is the sum of the current components $I'_F$ and $I''_F$. It is also to be noted that although no integrating or differentiating circuit is shown in the arrangement of Fig. 9 it is to be understood that Fig. 9 may incorporate such networks if desired.

Referring now to Fig. 10, which is a self-saturating type of push-pull self-balancing magnetic amplifier employing the features of transformless power supply and output coupling transformer of Fig. 9, there is shown a preferred embodiment of the invention utilizing a pair of positive feedback channels in the line circuit of the push-pull arrangement and additional regenerative feedback windings for providing positive or negative "fractional turns." Bias is provided for the core reactors through biasing circuits including the bias windings on the respective core reactors in series with unnumbered half-wave rectifiers and biasing resistors. As in the preceding embodiments of Figs. 3 and 9, each of the core reactors has a load winding and a control winding wound thereon and arranged to provide self-excitation. The control windings of all of the reactors being connected in series with the negative feedback resistors $R'_F$ and $R''_F$ to obtain a balanced control-circuit condition as aforedescribed.

Rectifiers R1 and R4 are arranged to conduct when terminal 17 is positive to apply current components $I_{R1}$ and $I_{R4}$ across the negative feedback resistors $R'_F$ and $R''_F$ respectively, and across primary windings sections P1' and P2' respectively, of transformer TM, rectifiers R3 and R4 conducting on the half-cycle of power supply 15 when terminal 19 is positive to develop current components $I_{R2}$ and $I_{R3}$.

Figure 7:
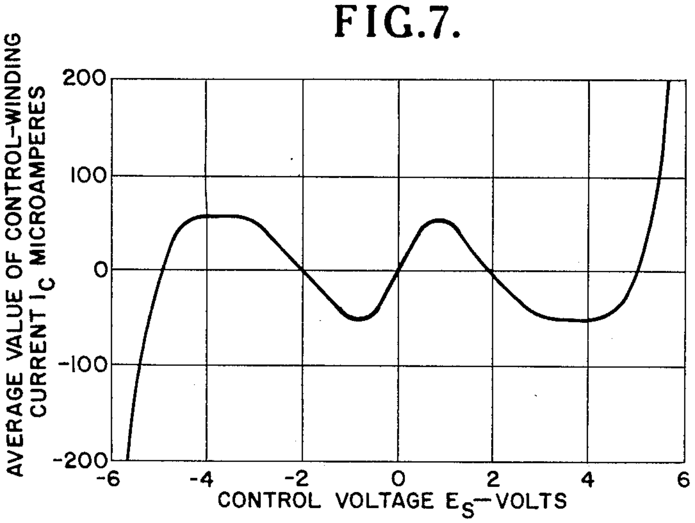
Fig. 7 is a performance characteristic illustrating the average value of control-winding current as a function of D. C. signal voltage of self-balancing magnetic amplifier arrangements.

A first positive-feedback channel is provided by serially connected windings PF' wound on each of core reactors 12, 14, 16 and 18; and, a second positive feedback channel consists of serially connected windings PF" wound on each of the core reactors. Positive feedback channel PF' is arranged to pass the current components $I_{R1}$ and $I_{R3}$ conducted by rectifiers R1 and R3, whereas positive feedback channel PF" is connected to pass the current components $I_{R2}$ and $I_{R4}$ conducted through rectifiers R2 and R4. The regenerative feedback circuit is connected across the opposite terminals of line resistors $R'_L$ and $R''_L$, as in Fig. 9. By employing a pair of positive feedback channels in combination with a regenerative feedback circuit in a self-saturation circuit, it is possible to use a very high resistance value for the regeneration-control resistor $R_{RF}$ and thereby preserve the desired half-cycle response of the amplifier. Fig. 7 shows the average control-winding current $I_C$ as a function of polarity-reversible D. C. signal voltage, $\pm E_S$, when a properly rated regeneration-control resistor $R_{RF}$ is provided in the boosting circuit RF. Evidently, the average value $I_C$ varies within limits from zero to $\pm 100$ microamps, and the A. C. component of $I_C$ may be reduced to values of the same order by introducing a choke coil into the control-circuit loop without affecting the transient performance of the amplifier.

The mode of operation of Fig. 10 with respect to the two-phase motor 50 and the feedback resistor $R'_F$ and $R''_F$ is the same as that described for Fig. 9 and is as illustrated in Figs. 2(a) and 2(c).

Although no integrating network or differentiating network is shown in the arrangements of Figs. 9 and 10, it is to be understood that the inclusion of such networks may be made if desired. By referring to Fig. 11, the operation of an integrating network in the negative feedback channel of a self-balancing amplifier can be readily appreciated and understood from the diagrammatic representation of the flow of current components throughout the network.

From the foregoing, it is apparent that the invention presents a practical concept of self-balancing magnetic amplifier arrangements in combination with phase-sensitive circuits for position-indicating synchro-transmission systems to provide advantages heretofore unattained but desired in prior art position servomechanism systems. It is additionally apparent that the invention presents novel forms of phase-sensitive circuits utilizing auxiliary resistive elements across the output thereof and in series circuit relationship with the control windings of a self-balancing type of magnetic amplifier, which resistive elements make possible the combination of self-balancing magnetic amplifiers with phase-sensitive circuits.

As utilized in the claims, the term "self-balancing magnetic amplifier" is to be construed as defining a D. C. controlled magnetic amplifier characterized by the combination of positive magnetic feedback (derived either from positive external feedback or self-saturation) and negative electric feedback derived from feedback resistors connected in series with the control windings of the magnetic amplifier.

Obviously many modifications of the present invention are possible in the light of the above teaching. It is therefore to be understood, that within the scope of the teachings herein and the appended claims, the invention may be practiced otherwise than as specifically described.

What is claimed and desired to be secured by Letters Patent of the United States is:

1. In combination, a phase-sensitive circuit energized with an A. C. error signal from the synchro-control transformer of a position servomechanism system and with a substantially constant A. C. reference signal from an A. C.

power supply source to derive therefrom a D. C. output control signal having a polarity and magnitude corresponding to the difference in magnitude and phase between said error and reference signals, a push-pull self-balancing magnetic amplifier having an input control-winding circuit so connected in operative circuit relationship with the output load circuit of said amplifier that the effective control current flowing through the control windings of said amplifier is substantially zero throughout the operating range thereof, resistive means connected to receive thereacross said D. C. control signal, and circuit means connecting said resistive means in closed series circuit relation with said input control circuit whereby the D. C. control signal across said resistive means is translated to said input control circuit to thereby render said amplifier effective to drive a servo motor in accordance with the polarity and magnitude of said D. C. control signal.

2. The combination of claim 1, wherein said push-pull self-balancing magnetic amplifier comprises a pair of saturable-reactor sections each of which includes two saturable core reactors with associated load and control windings cooperatively arranged to perform the push-pull function of the amplifier, circuit means including said power supply source and unidirectional conductive devices for applying half-wave current pulses to said load windings in prescribed manner for push-pull operation, positive feedback means in conductive circuit relationship with said load windings to provide positive magnetic feedback, and degenerative feedback means in conductive circuit relationship with said load windings and in closed series circuit relation in said input control circuit for causing a degenerative feedback current substantially equal in magnitude with said D. C. control signal to flow through said control windings in a direction opposite the direction of current flow of said D. C. control signal whereby said zero effective control-current condition is obtained.

3. The combination of claim 2, wherein said positive feedback means comprises external feedback windings on said core reactors, and wherein said degenerative feedback means comprises a pair of serially connected resistors arranged to conduct the half-wave current pulses flowing through said load windings to derive said degenerative feedback current therefrom, said resistors being connected in series with said control windings to present said derived degenerative feedback current in polarity opposition to the D. C. control signal translated to said input control circuit by said resistive means.

4. The combination of claim 3, wherein said resistive means consists of a pair of serially connected auxiliary resistors; and wherein said phase-sensitive circuit is of the phase-sensitive rectifier type defined by a signal-voltage transformer with the primary winding thereof connected to receive the A. C. error signal from the synchro-control transformer, first and second secondary windings on said signal-voltage transformer, a reference-voltage transformer with the primary winding thereof connected to receive the A. C. reference signal from said power supply source, first and second secondary windings on said reference-voltage transformer, a first full-wave bridge-type rectifier circuit interconnecting said first secondary windings of said signal-voltage and reference-voltage transformers to develop a first unidirectional output-voltage component which is the difference of the voltages induced in said first secondary windings by their respective primary windings, circuit connections for applying said first output-voltage component across one of said auxiliary resistors, a second full-wave bridge-type rectifier interconnecting said second secondary windings of said signal-voltage and reference-voltage transformers to develop a second unidirectional output-voltage component which is the sum of the voltages induced in said second secondary windings by their respective primary windings, and circuit connections for applying said second output-voltage component across the other of said auxiliary resistors, the voltage components applied across said auxiliary resistors being in opposing phase sense whereby the composite voltage appearing across the pair of auxiliary resistors as a unit is the difference between said voltage components and defines the D. C. control signal applied to the input control circuit of said push-pull amplifier.

5. The combination of claim 3, wherein said resistive means consists of a single auxiliary resistor; and wherein said phase-sensitive circuit is of the transistor demodulator circuit type defined by a signal-voltage transformer with the primary winding thereof connected to receive the A. C. error signal from the synchro-control transformer, first and second secondary windings on said signal-voltage transformer, a reference-voltage transformer with the primary winding thereof connected to receive the A. C. reference signal from said power supply source, first and second secondary windings on said reference-voltage transformer, a first pair of transistors interconnecting said first secondary windings of said signal-voltage and reference-voltage transformers to apply across said auxiliary resistor a first unidirectional output-voltage component which is the difference of the voltages induced in said first secondary windings by their respective primary windings, and a second pair of transistors interconnecting said second secondary windings of said signal-voltage and reference-voltage transformers to apply across said auxiliary resistor a second unidirectional output-voltage component which is the sum of the voltages induced in said second secondary windings by their respective primary windings, the voltage components applied across said auxiliary resistor being in opposing phase sense whereby the utilizable voltage appearing across said auxiliary resistor is the difference of said voltage components and defines the D. C. control signal applied to the input control circuit of said push-pull amplifier.

6. The combination of claim 3, wherein said resistive means consists of a single auxiliary resistor, and wherein said phase-sensitive circuit is of the star-modulator phase-sensitive rectifier type which is operable to compare an A. C. error signal applied thereto with an A. C. reference signal applied thereto to thereby derive a first unidirectional output-voltage component which is the sum of said error and reference signals and a second unidirectional output-voltage component which is the difference of said error and reference signals, and circuit connections for applying said first component across one of said auxiliary resistors and for applying said second component across the other of said auxiliary resistors, the components applied across said auxiliary resistors being in opposing phase sense whereby the composite voltage appearing across said pair of resistors as a unit is the difference between said voltage components and defines the D. C. control signal applied to the input control circuit of said push-pull amplifier.

7. The combination of claim 2, wherein said positive feedback means includes said load windings so arranged as to provide self-saturation in said saturable-reactor sections, and wherein said degenerative feedback means comprises a pair of serially connected resistors arranged to conduct the half-wave current pulses flowing through said load windings to derive said degenerative feedback current therefrom, said resistors being connected in series with said control windings to present said derived degenerative feedback current in polarity opposition to the D. C. control signal translated to said input control circuit by said resistive means.

8. The combination of claim 7, further including an output coupling transformer having a pair of center-tapped primary windings to define four primary winding sections connected to the load windings of said saturable-reactor sections, each of said primary winding sections being adaptable to pass a predetermined respective one of said half-wave current pulses, and a single secondary winding on said output transformer connected in conductive circuit relationship with the servo motor to drive said motor in a manner correlative to the current induced in said secondary winding by said four primary winding sections.

9. The combination of claim 8, further including a pair of positive feedback channels, each of said channels including in series a positive feedback winding on each of said core reactors, said feedback channels being connected to said loading windings so that the half-wave current pulses flowing through the two core reactors of one of said saturable-reactor sections during the first half-cycle of said A. C. power supply source flow through a respective one of said feedback channels and so that the half-wave current pulses flowing through the two core reactors of the other of said saturable-reactor sections during the second half-cycle of said power supply source flow through a respective one of said feedback channels, and a regenerative feedback channel including in series a regenerative feedback on each of said cores and a regeneration-control resistor for providing fractional feedback turns to obtain a high speed of amplifier response operation.

10. The combination of claim 9, further including an R–C integrating network connected in conductive circuit relation with said degenerative feedback means.

11. An input control-winding circuit intercoupling the input of a self-balancing push-pull magnetic amplifier with the output of a phase-sensitive circuit which is operable to provide across the output terminals thereof a polarity-reversible D. C. control signal for said amplifier: said input control-winding circuit including, in closed series circuit connection and in the order named, resistive means connected across the output terminals of said phase-sensitive circuit, the control windings of one saturable-reactor section of the push-pull magnetic amplifier, a pair of negative feedback resistors through which the load current components of the amplifier flow, and the control windings of the other saturable-reactor section of the push-pull magnetic amplifier.

References Cited in the file of this patent

UNITED STATES PATENTS

| | | |
|---|---|---|
| 2,683,843 | Geyger | July 13, 1954 |
| 2,700,130 | Geyger | Jan. 18, 1955 |
| 2,755,562 | Harlburt | July 24, 1956 |